Jan. 12, 1971  MICHIO ABE  3,553,826
METHOD OF MAKING BALL STUDS
Filed March 22, 1968  2 Sheets-Sheet 1

INVENTOR.
MICHIO ABE
BY Oho John Munz.
ATTORNEY

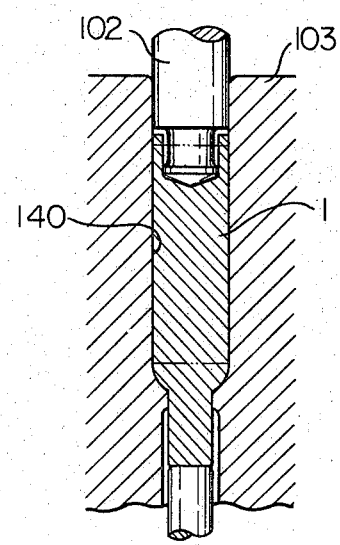
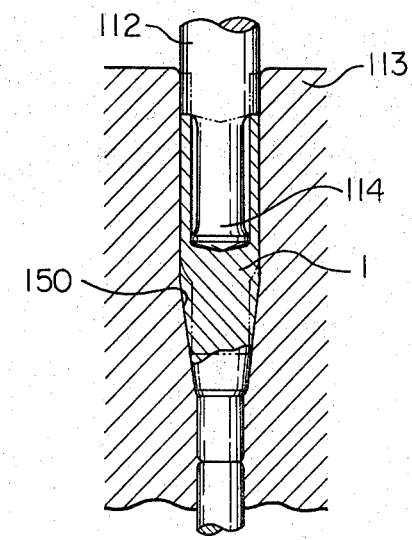
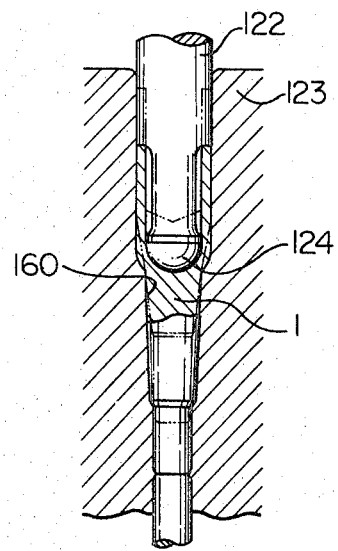
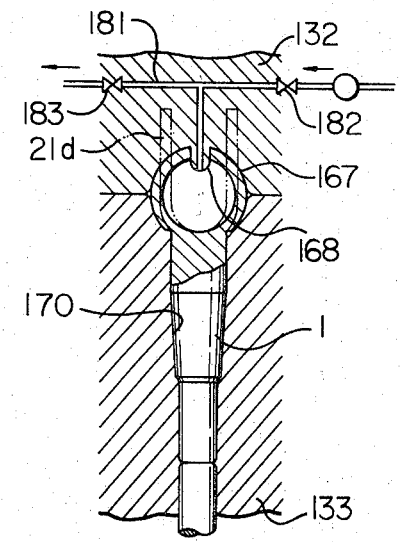

3,553,826
METHOD OF MAKING BALL STUDS
Michio Abe, Kasugai-shi, Japan, assignor to Tokai Cold Forming Co., Ltd., Aichi-ken, Japan, a Japanese corporate body
Filed Mar. 22, 1968, Ser. No. 715,207
Claims priority, application Japan, Aug. 16, 1967, 42/52,199
Int. Cl. B23p 17/00; B21d 53/10
U.S. Cl. 29—527.2                    1 Claim

ABSTRACT OF THE DISCLOSURE

The method of making ball studs in cold-pressing by a transfer press in which a blank having generally the same volume and outer diameter as a finished ball stud and its shaft portion, by first cutting and then extruding the blank forwardly to form a tapered stem and shank portion, forming a preliminary cylindrical shape for the spherical head portion by backwardly extruding the blank, and then upsetting the preliminary cylindrical shape to form the spherical head portion.

BACKGROUND OF THE INVENTION

Field of the invention

This invention relates generally to the method of making ball studs for broad and various uses.

Description of the prior art

Loads are applied to the head of a ball stud in various directions according to the usage of its suspension, the dimensions of the spherical head must be determined in accordance with the required strength of the ball sheet against the applied load so as to maintain its proper rigidity. Further, as the ball stud bears the repeated load from various direction at random, the shank of the ball stud must be formed so as to have a diameter with sufficient strength to support the load. In the conventional method of forming the ball stud, inasmuch as the upsetting ratio is extremely large such as 3 to 4, complicated techniques are required to form the ball stud from the blank, while at the same time the rigidity and strength of the spherical head formed is much greater than required, as compared with that of the shank, resulting in a weak neck portion between the spherical head portion and the shank of the ball stud.

In the conventional method of making ball studs, upon completion of cutting rod into blanks of the desired length, the blank is first extruded into the desired initial shape forming the beveled end, stem, tapers, shank and approximately one-half of the head in the partially formed condition. Thereafter, the stem, taper and shank portions are essentially finally formed, and then the head of the blank is further shaped into its ultimate fully round configuration by using a die of somewhat deeper head cavity driving the punch forwardly and against the blank in order to form a generally concave recess at the top of the blank. Then a punch having a shaping surface of generally thimble-shaped configuration is moved forwardly into the cavity and into the head recess provided therein by the former step. As the shaping surface of the punch continues forwardly into the partially shaped head of the stud, the head material surrounding the shaping surface is forced outwardly in the head cavity of the die in contact with the walls thereof. Upon reaching the end of travel of the punch, the head portion of the stud is provided therein with thimble-shaped cavity, which cavity conforms to the curvature of the shaping surface. In the final step in which the head is shaped into its fully round or ball-shaped configuration, the outer walls of the partially shaped head are surrounded by the shaping surface of the die, and caused to roll radially inwardly thereon. This transforms the generally thimble-shaped cavity of the shape into a substantially round cavity. The conventional method uses a blank having the same diameter of the stem portion at the stem portion of the blank and is expanded at the taper portion to the largest diameter of the taper portion by pressing however since the contraction percentage of the cross-sectional area has been found to be limited to the degree of twenty-eight percent even at maximum, and since in most of the cases the upsetting length was too long compared to the diameter of the cross-section of the blank, that is the upsetting ratio $s$, the ratio of the upsetting length $l$ to the diameter $d$ of the cross section of the blank, the blank would not upset since the prior step pressed such a slim blank into the taper portion and head portion so as to expand it more than the above condition or restriction.

Further, in the conventional step the difference between the diameter of the spherical portion and that of the shank is small, and the blank is upset in one step to the final spherical diameter. Normally, the upsetting ratio $s$, that is $l/d$ is limited to 1.8 or less in the step, and even though the prior process uses as the conventional manner a punch having a recessed portion at one end thereof so as to restrict its bending the ratio $s$ is theoretically limited to 4 or less. In this process also the cut cross-section face of the blank must be extremely smooth and flat, and further horizontal to the normal surface of the axis of the blank which needs to be finished by machining. Therefore, when the process uses a step such as to cut the rod by means of knife or cutter and sleeve in the multi-stage transfer press, using the above conventional method it is extremely difficult to upset the blank in one step to perform $s$ or $l/d$ equal to 4 or less. Or the work hardening rate of the blank or material becomes larger and as a result it becomes difficult to extrude at the next step.

SUMMARY

This invention eliminates the abovementioned disadvantages of the conventional method of making ball studs and provides an improved method of making ball studs in cold-pressing by a transfer press.

One feature of the present invention is to adopt a blank having the same diameter as the largest diameter of the spherical portion equal to that of the shank of the finished ball stud, thereby it is possible to extrude the blank forwardly more than fifty percent at both the taper and beveled portions and stem portion at the same time.

Another feature of the present invention is to press the blank into the spherical head by forming the preliminary or intermediate shape without upsetting it in one step, thereby enabling the upsetting ratio $s$ or $l/d$ easily equal to 4 or less.

A still further feature of the present invention is to provide several preliminary shaping steps for making ball studs having larger spherical head by using a punch having a longer projection at its end and by backwardly extruding the head portion so as to gradually form the preliminary cylindrical shape step by step.

Still another feature of the present invention is to provide an oil hole within the punch so as to spray oil through the hole into the cavity of the blank at the head portion in order to avoid buckling of the cylindrical wall during its pressing step to form the head into the spherical shape.

Therefore, one object of the present invention is to provide an improved method of making ball studs so as to be very easily extruded for mass production.

Another object of the present invention is to provide an improved method of making ball studs having larger spherical head so as to be extruded very simply and easily.

A still further object of the present invention is to provide an improved method of making ball studs wherein the deformation resistance of the blank is very small so as to provide a ball stud with a very small opening at the top.

Still another object of the present invention is to provide an improved method of making strong ball studs in simple step with less power so as not to need the complicated technics for mass production for various broad size.

In order to accomplish the above object, one aspect of the present invention provides a method of making ball studs in cold-pressing by a transfer press comprising the steps of cutting a blank having generally the same volume and outer diameter as a finished ball stud and its shaft portion, forming upon the blank taper, stem and shank portions by forwardly extruding, the blank forming a preliminary cylindrical shape having generally the same thickness and volume as a finished spherical head portion by backwardly extruding, the blank forming upon the preliminary shape a spherical hollow head portion by upsetting it into the die cavity, and then by lessening deforming resistance in each step by using a blank having the same or slightly larger diameter as the shaft diameter of finished ball stud together with the use of oil and air enclosed and pressurizing the spherical hollow head portion.

Another aspect of the present invention provides a method of making ball studs in cold-pressing by a transfer press comprising the steps of cutting the blank forming the first preliminary cylindrical shape, and preliminary stem by forwardly and backwardly extruding the blank, forming the second preliminary cylindrical shape, and taper portion by forward and backward extruding, forming further the third preliminary cylindrical shape, stem, taper and shank portions by forward and backward extruding by means of a punch having a projection shaped at its end to have a semispherical end, and forming the top of the cylindrical portion so as to reduce it to finally form the spherical head and at the same time to expand the center portion thereof by spraying a mixture of oil and air into the cavity of the blank head through an oil hole in the punch, thereby avoiding the buckling of the cylindrical wall of the blank.

According to the present invention, since the working rate is smaller than the conventional method in backwardly extruding the cylindrical portion, the deformation from the cylindrical shape to the spherical shape is very easily done, thereby enabling the diameter of the hole on the top of the spherical head to be extremely small. And, as the deforming resistance of the blank is small the method of making larger ball studs is improved to afford greater economy in mass production.

Thus, the present invention provides a method of making ball studs in less power than the conventional method and in less powerful upsetting, pressing work, so as to provide accurate dimension of the spherical head on the finished products with good material flow in the deformed portion of the ball stud. Furthermore, it provides a stronger ball stud than the conventional one by making the top hole of the spherical head thereof very small so as to increase its durability for repetitive stress.

Other objects and advantages of this invention will further become apparent hereinafter and from the drawings.

BRIEF DESCRIPTION OF THE DRAWINGS

FIGS. 6 to 9 show another process of the present invention as its embodiment.

DESCRIPTION OF THE PREFERRED EMBODIMENT

Figure 1:
FIG. 1 is a plan view of the blank from which ball stud is formed in cut state.

Although specific forms of the invention have been selected for illustration in the drawings, and the following description is drawn in specific terms for the purpose of describing those forms of the invention, this description is not intended to limit the scope of the invention, which is defined in the claims.

Figure 2:
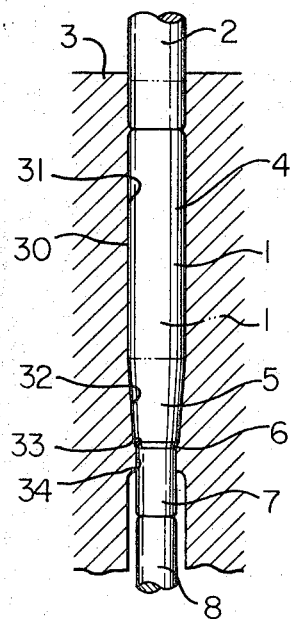
FIG. 2 is a sectional view of the first forming die showing the blank disposed in the cavity of the die by the first punch in accordance with the present invention.

Referring now to the drawings, particularly to FIG. 1, which shows a blank from which a finished ball stud may be formed, the blank 1 is a typical blank which has the same volume as the finished ball stud and the same diameter in cross section as the finished ball stud, which blank 1 is cut as desired at the first step in the present process by a multi-stage transfer press (not shown) from a cylindrical steel coil or rod (not shown). This blank 1 is then moved or located at the second step to the front of the first forwardly extruding die 3 (FIG. 2) by means of a transfer feed (not shown) and it is disposed adjacent and in alignment with the first die 3 as shown in FIG. 2, which is a sectional view of the first forming die showing the blank pressed into the cavity of the die 3 by the first punch 2. The die 3 has the internal cavity therewithin designated in its entirety by numerals 30, 31, 32, 33 and 34 corresponding to the outer shape essentially of the ball stud, with the exception of the ultimate head portion thereof. The blank 1 is fed into the cavity in the die 3 at the cylindrical portion 31 so as to provide the shank 4 of the ball stud therein by pressing with the punch 2 when the punch 2 moves axially toward the cavity of the die 3 driven by the crank (not shown) of the transfer press. As the punch 2 further moves into the cavity of the die 3 pressing the blank 1 along with the cavity, the blank 1 is reduced of its diameter at the respective tapered section 32 and beveled portion 33 within the cavity 30 so as to provide the respective tapered portion 5 and beveled shoulder 6 thereat, and is then forwardly extruded upon further forwarding of the punch 2 at the section 34 of relatively uniform diameter so as to provide the stem 7 of the ball stud at its one end at which a thread (not shown) may be formed over a predetermined length.

In this second step, as was described previously, it uses the blank having the same diameter as the largest diameter of the tapered portion equal to that of the shank of the finished ball stud, thereby the blank is possible to be extruded forwardly more than fifty percent at both the tapered and beveled portions and stem portion at the same time as will be hereinafter described in example.

Figure 3:
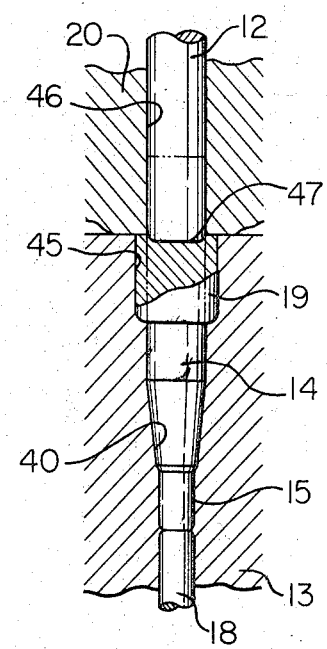
FIG. 3 is a sectional view of the second die showing a relatively shallow concave head cavity thereof provided by the third step prior to further shaping the head and cavity therein by the punch.

Upon completion of the second step as shown in FIG. 2, the blank 1 is pushed out from the cavity of the first die 3 by means of a knockout pin 8 to the front of the die 3 and at the same time it is gripped by the transfer feed (not shown) and is transferred to the front of the second die 13 (FIG. 3).

Referring now to FIG. 3, which is a sectional view of the second die 13 showing a relatively shallow concave head cavity 40 thereof as provided by the third step prior to further shaping the head and cavity therein by the punch 12, the third step presses it so as to form the first preliminary or partial shape of a spherical head by proceeding the punch 12 into the cavity 47 of the blank 1. The second die 13 has almost the same cavity corresponding to the shank, tapered and beveled portions and stem of the finished ball stud at the lower portion, and at its upper portion has a cavity 45 of intermediate size or diameter between the finished spherical head and shank in diameter. Cooperating with the die 13, a sleeve member 20 is provided on the die 13 having an axial bore 46 therein corresponding in diameter to the outer diameter of the punch 12 movable therewith. The second punch 12 moves axially toward the die 13 to extrude the blank 1 until it reaches knockout pin 18 at its lower end. Further as the punch 12 moves into the head of the blank 1, it moves radially and axially into the recess or cavity 45 to form a partially completed shape of its head as shown in FIG. 3. At the uppermost portion of the head of the blank 1 is formed the shallow recess or cavity 47 produced during continued axial travel of the punch 12 so as to assume the next step to extrude further therein, at the same time it is upset until at the opposite end of the die cavity 40 it reaches a knockout pin 18 and is formed on the surfaces conforming essentially to the stem, taper and beveled portions and shank of the finished or smooth curved surface.

Figure 4:
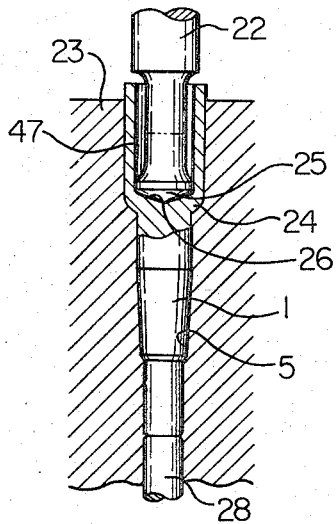
FIG. 4 is a sectional view of the third die showing shape to be formed from that in FIG. 3 prior to further formation of the stud head portion.

The blank 1 formed at the third step as was described is projected forwards from the cavity of the die 13 by a knockout pin 18 and is transferred by the transfer feed (not shown) to the front of third die 23 (FIG. 4).

Referring now to FIG. 4, which is a sectional view of the third die showing shape to be formed from that in FIG. 3 prior to further formation of the stud head portion, the fourth step is to extrude backwards the preliminary shape of the spherical head of the ball stud. The third punch 22 for backwards extruding moves axially into the cavity 47 of the previously formed blank of the third die 23 so as to press the blank until it reaches a knockout pin 28. The shape of the cavity 50 of the third die 23 is almost the same as the second cavity 40 of the second die 13. The diameter of the third punch 22 is predetermined such that when it extrudes backwards into the cavity 47 of the preliminary head, the head wall may be formed generally the same thickness as the finished head of the ball stud. The third punch is pressed into the cavity 47 of the head of the blank 1 until the bottom wall 24 of the head is formed generally the same thickness as that of the finished head of the ball stud or of the cylindrical side wall of the head of the blank 1, and this step is completed.

Figure 5:
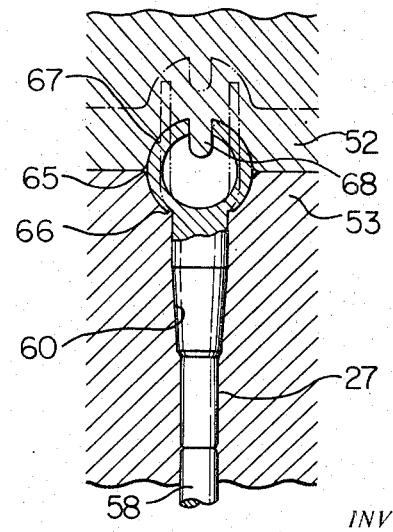
FIG. 5 is a sectional view of the fourth die showing the final forming of the head portion.

The blank 1 formed at the fourth step is projected forwards from the cavity 50 of the die 23 by a knockout pin 28 and is transferred by the transfer feed (not shown) to the front of fourth die 53 (FIG. 5).

In FIG. 5, which is a sectional view of the fourth die showing the final forming of the head portion, in the fifth step the blank 1 is pressed into a cavity 60 of the fourth die 53 by the fourth punch 52 until it reaches a knockout pin 58. The shape of the lower cavity 60 of the fourth die 53 is almost the same as the third cavity 50 of the third die 23, but that of the upper cavity thereof has a semispherical cavity portion 65 and a shoulder portion 66 at the lower end of the spherical cavity portion corresponding to those of the finished head of the ball stud so as to form a predetermined head of the finished ball stud. The fourth punch 52 has also a semispherical cavity portion 67 with a projection 68 at the upper center of the cavity. The diameters of both the fifth die and punch are approximately the same as that of the finished spherical head of the ball stud, but in order to remove a spring-back thereof upon the completion of the press of the spherical head portion and at the pressing to perform trimming or prevent from making trim between the die 53 and punch 52, the radius of adjacent the bottom of the spherical head is made 2 to 10 percent larger than that of the finished head of the ball stud. As the fourth punch 52 moves axially toward the die 53, the upper half portion of the cylindrical head portion or wall performed at the fourth step is reduced gradually along with the surface of the semispherical cavity portion 67 of the fourth punch 52 and the diameter of the upper opening of the cylindrical head is gradually reduced and at last the upper end of the cylindrical head reaches the projection 68 on the cavity surface of the punch 52. Further, the central portion of the cylindrical head is expanded outwards at its periphery by means of the compression as the punch 52 moves toward the die 53 so as to form the final shape of the hollow spherical head of the ball stud.

The cavity of the cylindrical head may be filled with a sprayed lubricant just prior to receiving the punch 52 by feeding a pressurized jet or spray of the lubricant into the cavity 68. Almost at the same time when in this step the punch 52 reaches the end of the cylindrical wall of the head, the sprayed lubricant with air filled in the cavity of the blank 1 is enclosed therein. As the punch 52 moves toward the die 53 the volume of inside the cavity decreases with increasing the inner pressure of the mixture of the lubricant and air, which pressure effects to operate to form the spherical head from the cylindrical shape.

In FIGS. 6 to 9, which show another process of the present invention as its embodiment, this process is essentially effective to the hollow spherical head ball stud having relatively larger spherical head portion to the diameter of its shaft or shank.

This process extrudes the blank forward and backward at the same time, that is, it works to extrude specially the blank and at the same time to press it so as to expand it in several steps in combination and in succession to minimize the power for each step and to make mass production.

Referring now to FIG. 6, which is a sectional view similar to FIG. 4 showing the second step of this process, in this second step the first die 103 receives at first a blank 1 cut at the first step in a predetermined length in its cavity 140 as illustrated by dot and dash lines in FIG. 6, which cavity has the same diameter as the blank 1 and has a preliminary shape of a stem of the ball stud therein. Then the first punch 102 moves axially toward the die 103 to forwardly extrude the blank 1 so as to form the preliminary shape of the stem at one end and at the same time to backwardly extrude it so as to form the first preliminary shape of the spherical head of the ball stud so as to form a cylindrical hollow shape at the other end.

Referring now to FIG. 7, which is a sectional view similar to FIG. 6 showing the third step of this process, the blank 1 from the second step is fed into the cavity 150 of the second die 113 as designated by dot and dash lines in FIG. 7. Then, the second punch 112 having a longer projection 114 moves axially into the cavity 150 so as to form the second preliminary shape or hollow cylindrical shape of the head of the ball stud by upsetting the blank 1 in the cavity 150 and pressing it thereby in order to forwardly extrude at one end the blank 1 to form the taper portion of the ball stud and to backwardly extrude at the other end it to form the second preliminary cylindrical shape of the spherical head of the ball stud, which make the blank 1 as a whole longer than that formed in the second step.

Referring now to FIG. 8, which is a sectional view similar to FIG. 7 showing the fourth step of this process, the blank 1 from the third step is transferred into the cavity 160 of the third die 123 as indicated by dot and dash lines in FIG. 8. The third punch 122 having a still longer projection 124 which has semispherical end moves axially into the cavity 160 so as to form the third preliminary shape or still longer hollow cylindrical shape of the head of the ball stud and at the same time to forwardly extrude the blank 1 still further at the stem, taper and shank portion.

Referring now to FIG. 9, which is a sectional view similar to FIG. 8 except having oil holes in the punch, showing the fifth step of this process, the blank 1 from the fourth step is fed into the cavity 170 of the fourth die 133 as illustrated by dot and dash lines in FIG. 9. In this step, when the punch 132 moves toward the die, the top end of the cylindrical shape of the head of the blank 1 is reduced and the center to bottom portion thereof is expanded so as to finally form the spherical head of the ball stud along with the spherical cavity 167 provided on the bottom of the punch 132.

In this particular step, the punch 132 has oil hole 181, check valve 182 and pressure regulating valve 183, and during this step spray oil is fed into the hollow cavity of the head of the blank 1 through the check valve 182 and oil hole 181 so as to pressurize the inner space thereof with the mixture of oil and air, at the same time the check valve 182 and oil hole 181 so as to pressurize the inner space thereof with the mixture of oil and air, at the same time the check valve 182 prevents the pressurized mixture from flowing back therethrough and the pressure regulating valve 183 adjust the inner pressure at a predetermined value by exhausting the excess oil and maintains the predetermined pressure therein of the mixture to seal it in the cavity of the blank in order to avoid the inward bucking of the cylindrical wall of the head of the blank 1 when it is pressed by the punch 132.

According to this step, since the working rate is smaller than the conventional method in backwardly extruded cylindrical portion, the deformation from the cylindrical shape to the spherical shape is very easily done, thereby enabling the diameter of the hole on the top of the spherical head to make it extremely small.

In these steps since the deforming resistance of the blank is small the method of making ball stud is improved and it is effected to make larger ball stud economically in greater production.

The experimental data in making the ball stud in accordance with the present invention will now be shown in the following Table 1 in comparison with the conventional method of making the ball stud by using chrome-molybdenum steel.

TABLE 1

|  | First embodiment | Second embodiment | Conventional method |
|---|---|---|---|
| Diameter of blank, mm | 15.2 | 18 | 11 |
| Cross-sectional constraction percentage in the second step, percent | [1] 48 | [2] 62 [3] 66 |  |
| The third step: |  |  |  |
| Pressing ratio | [4] 3.1 |  | ([5]) |
| Pressing rate, percent | 50 |  | 80 |
| Cross-sectional constraction rate, percent |  | [6] 48 [7] 66 |  |
| Deforming resistance, kg./mm.² | 85–88 | 80–84 | 95–110 |
| The fourth step: |  |  |  |
| Cross sectional constraction percentage, percent | [7] 47 | [6] 50 [7] 60 | [7] 80 |
| Deforming resistance, kg./mm.² | 90–95 | 80–85 | 100–120 |
| The fifth step: |  |  |  |
| Pressing spherical portion, kg./mm.² | 90–95 | 85–90 | 100–120 |

[1] Forwardly extruding 81 kg./mm.².
[2] Forwardly extruding 82.5 kg./mm.².
[3] Backwardly extruding 83.0 kg./mm.².
[4] Difficult.
[5] Approximately 8, extremely difficult.
[6] Forwardly extruding.
[7] Backwardly extruding.

In making the ball stud in accordance with the present invention, as the deformation resistance in each step is small, the required power is less than the conventional method, and further upsetting and pressing work in the present method is very easy, thereby the work hardening of the blank in the step is less than the conventional method and less producing the trim between the punch and die, and can maintain to provide accurate dimension of the spherical head on the finished products and can also maintain to have an excellent material flow in the deformed portion of the ball stud. Furthermore, the durability for the repetitive stress thereof is very increased thereby and the present process provide stronger ball stud than the conventional one by making the top hole of the spherical head of the ball stud very small.

What is claimed is:

1. A method of making ball studs in cold-pressing by a transfer press comprising the steps of:
    cutting a cylindrical blank having generally the same volume and outer diameter as that of a finished ball stud,
    forwardly extruding one end of said blank to form a preliminary stem and rearwardly extruding the other end of said blank to form a preliminary cylindrical portion;
    forming a second preliminary cylindrical shape and, taper portion by forward and backward extruding;
    forming a third preliminary cylindrical shape, stem, taper and shank portions by forwardly and backwardly extruding by means of the punch having a projection shaped at its end to have semispherical end; and
    forming the top of the cylindrical portion so as to reduce it to shape the spherical head and at the same time to expand the center portion thereof by spraying a mixture of oil and air into the cavity of said blank head, thereby avoiding the buckling of the cylindrical wall of the blank.

References Cited

UNITED STATES PATENTS

| 3,036,665 | 5/1962 | Ricks | 29—149.5 |
| 3,036,367 | 5/1962 | Ricks | 29—441X |
| 3,255,623 | 6/1966 | Ricks | 72—256 |

THOMAS H. EAGER, Primary Examiner

U.S. Cl. X.R.

29—149.5, 424